F. D. GREEN.
Mitering-Machines.
No. 140,267.  Patented June 24, 1873.
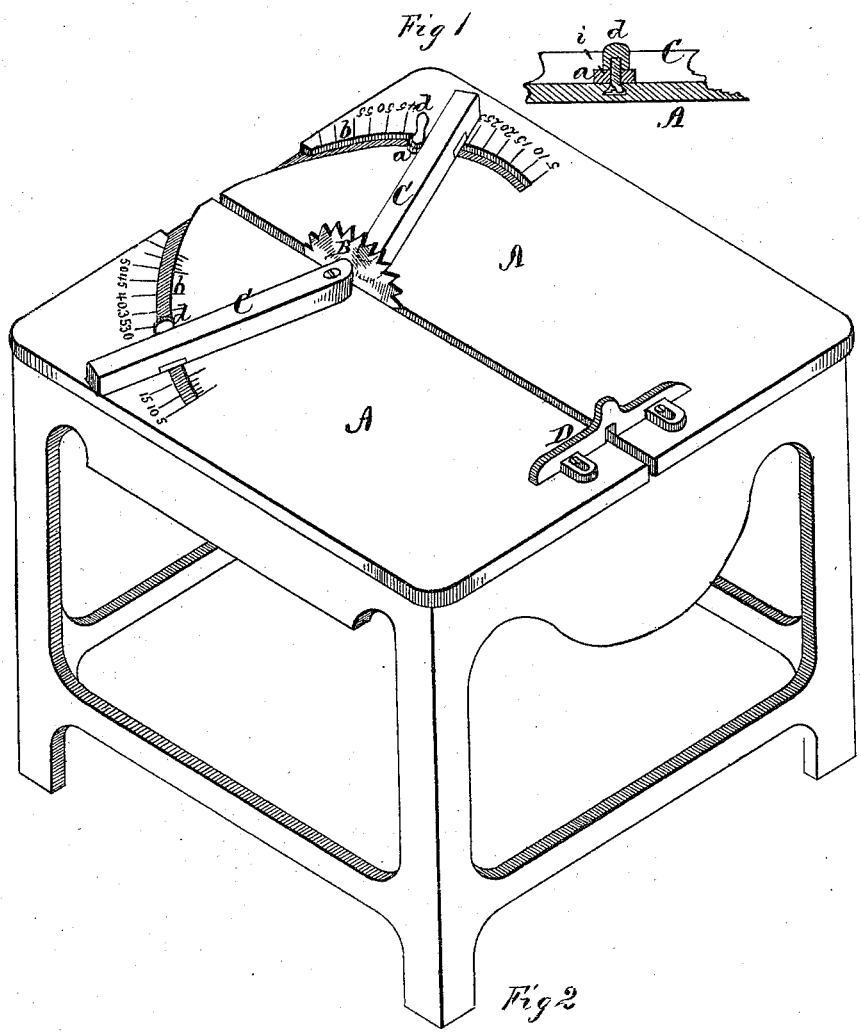
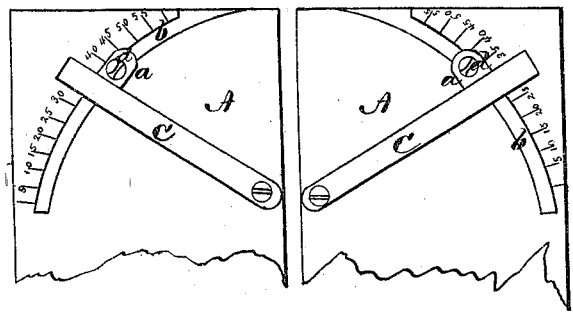

UNITED STATES PATENT OFFICE.

FRANCIS D. GREEN, OF WILLIAMSPORT, PENNSYLVANIA.

IMPROVEMENT IN MITERING-MACHINES.

Specification forming part of Letters Patent No. 140,267, dated June 24, 1873; application filed February 8, 1873.

*To all whom it may concern:*

Be it known that I, FRANCIS D. GREEN, of Williamsport, in the county of Lycoming and in the State of Pennsylvania, have invented certain new and useful Improvements in Mitering-Machines; and do hereby declare that the following is a full, clear, and exact description thereof, reference being had to the accompanying drawings, and to the letters of reference marked thereon, making a part of this specification.

My present invention is intended as an improvement upon the miter-machine for which Letters Patent were granted to me October 8, 1872; and it consists in the construction and arrangement of the supporting-table and the gage-bars, as will be hereinafter more fully set forth.

In order to enable others skilled in the art to which my invention appertains to make and use the same, I will now proceed to describe its construction and operation, referring to the annexed drawing, in which—

Figure 1 is a perspective view, and Fig. 2 a plan view of my invention.

A represents the table of the machine supported upon any suitable frame, and made in two sections placed so as to leave a space in the center for the passage of the saw B. This saw is arranged to have a rotary motion as well as being capable of moving back and forth. Upon each section of the table A, as close to the inner edge as possible, is pivoted a gage-bar, $c$, near the outer end of which is an ear or projection, $a$, extending toward the rear. This ear or projection is directly over a curved dove-tail groove, $b$, in the table, said groove being made on a circle having its center in the pivot of the gage-bar. A headed-screw, $i$, is inserted in the groove $b$, and passes up through the projection $a$, with a thumb-nut, $d$, on the end, by which means the gage-bar may be held at any angle desired. The grooves $b\ b$ are graduated as shown, so that the operator can readily set the bars at the precise angles to cut the desired bevels.

It will be seen and understood that each gage-bar is secured to the table by a stationary screw; hence the grooves $b\ b$ are not absolutely necessary to the proper working of the bars. The table may be provided with small perforations on the line of the graduated segments of circles, and the bars held at the required angle by passing the thumb-nuts or pins into the perforations.

By thus arranging the arms upon the table, I am enabled to cut the lumber with the grain, and not against the grain as is done, by arranging the arms as shown in my former patent referred to. I am also enabled to revolve each arm a full half circle on the table, so as to allow the timber to be cut at any angle. The piece to be sawed is laid on the table against one of the gage-bars, and the saw moved forward, cutting it at the desired bevel. Near the front edge of the table A, straddling the two sections, is an adjustable gage, D, as shown. For dadoing or cutting gains in window-frames, cabinet-work, &c., the saw may be taken out and a "dado," (or a round tool with knives,) put in.

Having thus fully described my invention, what I claim as new, and desire to secure by Letters Patent, is—

The bars $c\ c$, pivoted at their inner ends to the slotted table A A, as shown and provided with ears $a\ a$ and thumb-nuts $d\ d$, all as and for the purposes set forth.

In testimony that I claim the foregoing I have hereunto set my hand this 6th day of February, 1873.

FRANCIS D. GREEN.

Witnesses:
C. L. EVERT,
A. N. MARR.